United States Patent

[11] 3,576,393

[72] Inventor Thomas Thompson
 Silver Spring, Md.
[21] Appl. No. 690,808
[22] Filed Dec. 15, 1967
[45] Patented Apr. 27, 1971
[73] Assignee The United States of America as represented by the Secretary of the Navy

[54] AUTOMATIC EXPOSURE CONTROL FOR A SLOW SCAN VIDICON
 5 Claims, 1 Drawing Fig.
[52] U.S. Cl. .................................................. 178/7.2
[51] Int. Cl. .................................................. H04n 5/26
[50] Field of Search ........................................ 178/7.2, 7.2 (E)

[56] References Cited
 UNITED STATES PATENTS
 2,930,929 3/1960 Sheldon ..................... 178/7.2(E)
 3,086,077 4/1963 Mayer ....................... 178/7.2(E)
 3,102,163 8/1963 Sennhenn ................... 178/7.2(E)
 3,437,749 4/1969 Klem ......................... 178/7.2(E)

Primary Examiner—Richard Murray
Assistant Examiner—Richard P. Lange
Attorneys—R. S. Sciascia and J. A. Cooke ABSTRACT: The present invention provides an automatic exposure control circuit for a vidicon camera tube wherein the target element of the vidicon is utilized as the "heart" of its own exposure control. More specifically, the target element output signal is integrated to produce a voltage whose magnitude is proportional to average image intensity; which proportionate or analog voltage is then compared to a reference voltage preselected in accordance with desired video output level. The comparator output is then used as instantaneous feedback to operate the vidicon shutter when the proportionate or analog voltage signal comes into agreement with the reference voltage.

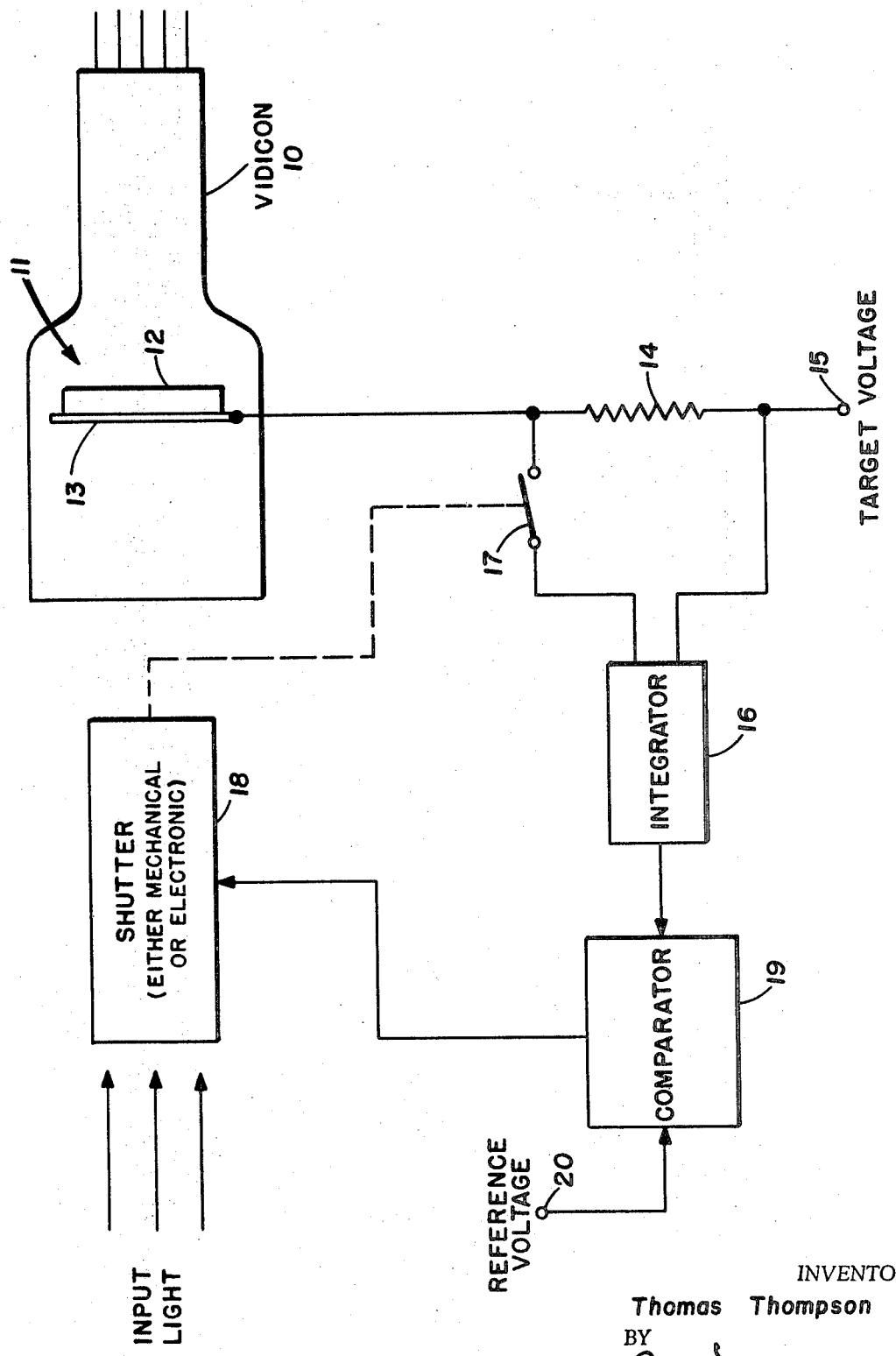

1

AUTOMATIC EXPOSURE CONTROL FOR A SLOW SCAN VIDICON

BACKGROUND OF THE INVENTION

The present invention generally relates to automatic exposure control circuitry for television camera tubes and more particularly, it relates to automatic exposure control circuitry for any slow scan vidicon camera tube, including the so-called SEC vidicon.

Much research effort is currently being expended in the area of television satellite work; i.e., the mounting of a television system on a near earth satellite for the purpose of obtaining television pictures of the earth from the orbiting satellite. Vidicon camera tubes are particularly attractive for this television satellite application and the need thus exists for circuitry capable of insuring that the video output level from the camera tube aboard the satellite is maintained at an acceptable level. This is particularly so in view of the fact that the input light intensity received at the satellite may be subject to wide range variations. Without an automatic exposure control for the television camera tube in the satellite, unacceptable video information is often obtained.

Although many exposure control methods and associated apparatus have been proposed heretofore, they are unsuitable or unadapted for exposure control of a slow scan vidicon. In other words, the prior art is restricted in one sense to providing exposure control for so-called returned beam-type camera tubes, such as the image orthicon. On the other hand, certain of the prior art control systems are peak exposure-type systems wherein the peak image intensity is sensed and subsequently utilized for controlling the exposure of the camera tube. This latter type of system is unadaptable to providing average image intensity control by adjustment of the video output level in that the peak-type system operates on a frame-to-frame basis and implies that the input light intensity information content in the scene being viewed will remain relatively constant from frame to frame.

It is proposed in accordance with the present invention to provide automatic exposure control circuitry, particularly adapted for use with slow scan vidicon camera tubes wherein the instantaneous image intensity at the vidicon target elements is sensed and then averaged to produce a signal proportionate to the average image intensity seen by the camera tube. The analog of the average image intensity is then subsequently utilized to control the camera tube shutter, which may be either mechanical or electronic, in such a manner that the shutter is closed when the video output on the camera tube reaches a proper and acceptable level. In this manner, the video output from the camera tube is maintained relatively constant and therefore suitable for use in a television satellite system wherein, as previously mentioned, the system is particularly susceptible to variations in the intensity of the input image viewed by the satellite-borne camera tube.

One object of the present invention is therefore to provide an improved automatic exposure control system for slow scan vidicon camera tubes.

A further object of the present invention is to provide a control system capable of controlling the amount of exposure to which a slow scan vidicon camera tube is subjected in response to the average video output level of the camera tube.

A still further object of the present invention is to provide an automatic exposure control system for a slow scan vidicon camera tube wherein the target element of the camera tube forms an essential part of the camera tube's exposure control system, thus obviating the need for additional equipment such as well-known beam splitters, etc.

Other objects, purposes and characteristic features of the present invention will in part be pointed out as the description of the invention progresses and in part be obvious from the accompanying drawing which illustrates one embodiment of the proposed automatic exposure control circuit of the present invention, as adapted to control the exposure of a vidicon camera tube.

Referring now to the drawing, the automatic exposure control circuitry, proposed in accordance with the present invention is particularly adapted for controlling the exposure of a vidicon camera tube, represented at 10. As is well known to those skilled in the art, the typical slow scan vidicon camera tube includes a target element 11 which comprises a semiconductor member 12 mounted on a conductive plate member 13. This target element 11 is directly exposed to the input light image used by the vidicon camera tube 10. In the so-called SEC vidicon, the input light image is first converted to an electronic pattern at a photocathode disposed in front of the target element and the target is then exposed to the electronic image. In the SEC vidicon, the conductive plate 13 is a thin layer of aluminum.

As shown in the drawing, the conductive plate 13 of the target element 11 is connected, through a suitable resistor 14 to a source of so-called target voltage 15. During operation, electrons leak off the semiconductor material 12 through the resistor 14 from regions where light (in the normal slow scan vidicon) or where the electronic image (in the SEC vidicon) strikes the target element. Therefore, the number of leakage electrons; i.e., leakage current, which flow through the resistor 14 is proportional to the instantaneous light intensity or electron image intensity to which the target element 11 is subjected. This in turn is proportionate to the input light intensity viewed by the vidicon camera tube 10.

It is proposed in accordance with the present invention to integrate the leakage current flowing through the target resistor 14 and thereby obtain a measure of the average light intensity being viewed by the vidicon camera tube 10. To accomplish this, a suitable integrator circuit 16 is adapted to be connected across the target resistor 14, by the switch 17, to integrate or average the target leakage current from the vidicon 10. The switch 17 is controlled in turn by the operation of the camera tube shutter 18, which can be either mechanical or electronic, in such a manner that the switch 17 is closed, to complete the connection to the integrator 16, when the camera tube shutter 18 is in its open position. As is well known to those skilled in the art, electronic shuttering of the vidicon camera tube 10 can be accomplished by removing the acceleration high voltage from the camera tube 10. The electronic or mechanical shuttering action provided by shutter 18 is diagrammatically represented in the drawing by the dashed control line 18a extending between the shutter 18 and the INPUT LIGHT.

The integrator circuit 16 produces an output voltage signal representing the average or integrated value of the leakage current; i.e., video output level, from the vidicon 10. This integrator output voltage signal is applied to a suitable comparator circuit 19, along with a preselected reference voltage signal preset in accordance with the desired video output level from the vidicon 10. The comparator 19 operates in a conventional manner, to produce an output signal when the integrator output voltage signal becomes equal to the preset reference voltage signal applied at input 20. More specifically, the comparator output is applied to the shutter mechanism 18 and is effective to operate the shutter to its closed position when the video output level from the vidicon reaches its desired value, as preset by the reference voltage 20.

From the foregoing description, it will thus be seen that the proposed automatic exposure control circuitry of the present invention provides an effective means for accurately controlling the video output level from the illustrated vidicon camera tube 10. Moreover, the proposed control circuitry accomplishes the desired automatic exposure control on an instantaneous feedback basis and utilizes a direct measure of the input light intensity to determine when to close the camera tube shutter. This obviously is more desirable than utilizing the image or video output level observed on one frame of operation to control a subsequent frame output, as proposed in the prior art.

Obviously, many modifications, adaptations, and alterations of the present invention are possible in the light of the above teachings Therefore, it should be understood at this time, that within the scope of the appended claims, the invention may be practiced otherwise than as specifically described.

I claim:

1. In combination:

a vidicon camera tube having a target element and being equipped with a shutter having open and closed positions, said target element being exposed to an image when said shutter is in its open position, circuit means operably connected to said target element and effective during a frame interval when said target element is exposed to an image to produce an analog output signal proportionate to the average image intensity at said target element, and control means responsive to said analog output signal for closing said shutter during the same frame interval to terminate exposure of said target element to said image when said output signal exceeds a predetermined value.

2. The combination specified in claim 1, wherein said control means includes:

a reference signal source, comparator means operably connected to compare the output signal from said circuit means with said reference signal, and means operably connected to said comparator means for closing said shutter when said analog output signal from said circuit means exceeds said reference signal.

3. The combination specified in claim 2, wherein said reference signal is preset in accordance with the desired video output level for said vidicon camera tube.

4. The combination specified in claim 1, wherein said circuit means includes:

a resistor connected in circuit series with said vidicon target element and across which is developed a voltage signal proportionate to the instantaneous image intensity at said target element when said shutter is open, and integrator means having its input connected across said resistor for integrating said resistor voltage signal.

5. The combination specified in claim 4, further including a switch means responsive to the condition of said shutter and adapted to close the connection of said integrator input across said resistor when said shutter is open.